J. W. CURRAN.
MILK BOTTLE COVER.
APPLICATION FILED AUG. 1, 1913.
1,107,909.
Patented Aug. 18, 1914.
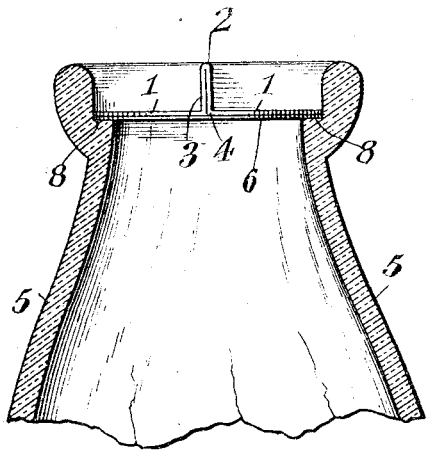
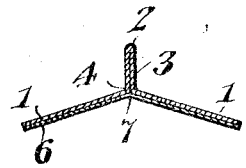
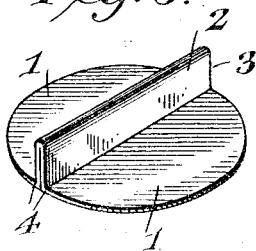
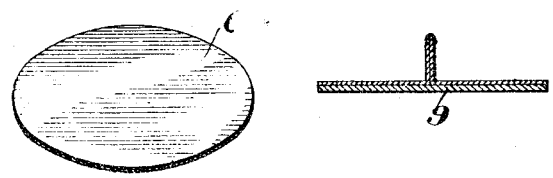
John W. Curran, INVENTOR

UNITED STATES PATENT OFFICE.

JOHN W. CURRAN, OF CINCINNATI, OHIO.

MILK-BOTTLE COVER.

1,107,909.  Specification of Letters Patent.  Patented Aug. 18, 1914.

Application filed August 1, 1913. Serial No. 782,537.

*To all whom it may concern:*

Be it known that I, JOHN W. CURRAN, a citizen of the United States, residing at Cincinnati, in the county of Hamilton and State of Ohio, have invented a new and useful Milk-Bottle Cover, of which the following is a specification.

The invention relates to improvements in milk bottle covers.

The object of the invention is to improve the construction of milk bottle covers, and to provide a simple, efficient and inexpensive milk bottle cover, designed to promote sanitation in the handling of milk bottles, and adapted to avoid smearing the hands or soiling the clothing or table linen, and capable of being easily lifted with the fingers without the aid of any instrument, removed from and replaced on a milk bottle and used as often as necessary, or until the contents of the bottle are consumed.

With these and other objects in view, the invention consists in the construction and novel combination of parts hereinafter fully described, illustrated in the accompanying drawing, and pointed out in the claim hereto appended; it being understood that various changes in the form, proportion, size and minor details of construction, within the scope of the claim, may be resorted to without departing from the spirit or sacrificing any of the advantages of the invention.

In the drawings:—Figure 1 is a vertical sectional view of the upper portion of a milk bottle provided with a cover, constructed in accordance with this invention. Fig. 2 is a sectional view of the milk bottle cover, showing the hinged portions arranged at an angle to facilitate the placing of the cover on and the removal of the same from a milk bottle. Fig. 3 is a perspective view of the milk bottle cover showing the same before the lower flexible disk is applied to the hinged segmental portions. Fig. 4 is a detail perspective view of the lower flexible disk. Fig. 5 is a sectional view of the milk bottle cover, showing another form of the invention.

Like numerals of reference designate corresponding parts in all the figures of the drawing.

In the accompanying drawing in which is illustrated the preferred embodiment of the invention, the milk bottle cover comprises in its construction an upper section formed from a strip or blank of pasteboard or other suitable material, rounded at the ends to form two segmental portions 1, and folded centrally at 2 to provide a two-ply flange 3, and also folded or creased at the base of the flange 4 to extend the segmental end portions 1 in opposite directions so as to form a disk as clearly illustrated in Fig. 3 of the drawing. The flange 3, which is disposed diametrically of the milk top or cover, extends upwardly therefrom and is adapted to be readily grasped in handling the milk top or cover to place the same on a milk bottle 5 or other analogous receptacle. While the cover or closure is designed principally for use in connection with milk bottles and is shown applied to a milk bottle in the accompanying illustration, yet it may be advantageously employed as a closure for various analogous receptacles containing milk or any other material.

The segmental portions 1, which are preferably semi-circular, are hinged to the flange 3 and are adapted to be arranged at an angle to each other, as illustrated in Fig. 2 of the drawing, to enable the milk top or cover to be easily placed on the milk bottle and readily removed therefrom; and in order to facilitate the handling of the milk top or cover and enable the same to be used indefinitely, the segmental portions 1 are permanently connected to form a continuous disk by means of a lower sheet or disk 6 of paper or other flexible material, which prevents a separation of the segmental portions 1 at the hinge joint. The lower flexible disk 6, which is secured by suitable adhesive material or other suitable means to the lower faces of the segmental portions 1, is creased at the center at 7 after being applied to the segmental portions of the upper section, and it forms a hinge joint coinciding with the hinge joints of the segmental portions 1 so as not to interfere with the hinge joints of the said portions 1 in permitting the latter to be arranged horizontally in the same plane or at an angle to each other. While it is preferable to connect the segmental portions 1 by means of a complete lower flexible disk, yet it will be understood that a flexible sheet of a less size may of course be employed, and the two-plies of the flange 3 may be secured together by adhesive material or other means for retaining the segmental portions 1 contiguous to each other. The hinging of the segmental portions of the milk top or cover enables the latter to be forced tightly upon the seat or shoulder 8 within the neck of the milk bottle 5; and the said upwardly extending flange, which preferably terminates either short of or substantially in flush relation with the upper edges of the neck of the milk bottle, forms a stiff brace or member. When the flange is grasped and pulled upward the milk top or cover is readily withdrawn from the bottle without splashing the contents of the same. The said upwardly projecting flange, besides forming a stiff brace, is adapted to frictionally engage at its ends the opposite walls of the mouth of the milk bottle to resist bending of the cover, and thereby assist in retaining the cover on the seat.

In Fig. 5 of the drawing is illustrated another form of the invention in which the lower connecting disk 9 is sufficiently heavy to connect the end portions of the strip and maintain the same in the same plane to form a flat disk-shaped milk bottle cover, adapted to be placed on and removed from a milk bottle without bending or forming a hinge joint between the segmental portions.

What is claimed is:—

A cover of the class described comprising a strip of material having segmental end portions and folded transversely between the same to form an upwardly projecting flange and bent outwardly at the base of the flange to provide hinge joints and to extend the said segmental portions in opposite directions, and a connecting disk secured to the lower face of the segmental portions and having a diametrically arranged crease coinciding with the outward bends of the said strip to form a central hinge to permit the said segmental portions to be arranged at an angle to each other in introducing the cover into and in removing it from the neck of a receptacle, said upwardly projecting flange being extended entirely across the cover and having its end edges arranged to frictionally engage the opposite walls of the mouth of the receptacle for assisting in retaining the cover in place.

In testimony, that I claim the foregoing as my own, I have hereto affixed my signature in the presence of two witnesses.

JOHN W. CURRAN.

Witnesses:
A. G. HAAR,
A. J. LARRICK.